(12) United States Patent
Baltes et al.

(10) Patent No.: US 10,400,800 B2
(45) Date of Patent: Sep. 3, 2019

(54) DAMPING DEVICE

(71) Applicants: HYDAC TECHNOLOGY GMBH, Sulzbach/Saar (DE); AIRBUS OPERATIONS GMBH, Hamburg (DE)

(72) Inventors: Herbert Baltes, Losheim (DE); Peter Kloft, Ransbach-Baumbach (DE); Robert Marinus Behr, Weyhe (DE); Frank Thielecke, Buxtehude (DE); Arne Waitschat, Hamburg (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 0 days.

(21) Appl. No.: 15/556,030

(22) PCT Filed: Feb. 19, 2016

(86) PCT No.: PCT/EP2016/000301
§ 371 (c)(1),
(2) Date: Sep. 6, 2017

(87) PCT Pub. No.: WO2016/142032
PCT Pub. Date: Sep. 15, 2016

(65) Prior Publication Data
US 2018/0045353 A1 Feb. 15, 2018

(30) Foreign Application Priority Data

Mar. 10, 2015 (DE) .................. 10 2015 003 015

(51) Int. Cl.
*F16L 55/04* (2006.01)
*F15B 21/00* (2006.01)
(Continued)

(52) U.S. Cl.
CPC ............ *F15B 21/008* (2013.01); *F15B 21/00* (2013.01); *F16L 55/027* (2013.01);
(Continued)

(58) Field of Classification Search
CPC ........... F16L 55/02736; F16L 55/02754; F16L 55/027; F16L 55/033; F16L 55/04; F16L 55/041; F15B 21/008
(Continued)

(56) References Cited

U.S. PATENT DOCUMENTS 2,233,804 A * 3/1941 Bourne .................... F16L 55/02
138/30
2,273,529 A * 2/1942 Kiefer .................... F16L 55/033
417/542
(Continued)

FOREIGN PATENT DOCUMENTS

DE 695 12 934 6/2000
DE 102 17 080 8/2003
(Continued)

OTHER PUBLICATIONS

International Search Report (ISR) dated Apr. 28, 2016 in International (PCT) Application No. PCT/EP2016/000301.

*Primary Examiner* — James F Hook
(74) *Attorney, Agent, or Firm* — Wenderoth, Lind & Ponack, L.L.P.

(57) ABSTRACT

A damping device for damping or avoiding pressure surges, such as pulses, in hydraulic supply circuits has a damping housing (1) surrounding a damping chamber and having a fluid inlet (35) and a fluid outlet (41). A fluid receiving chamber extends between the fluid inlet (35) and the fluid outlet (41). During operation of the device, a fluid flow crosses the damping chamber in a throughflow direction (11), from the fluid inlet (35) to the fluid outlet (41). Parts of
(Continued)

the fluid receiving chamber extend transversely with respect to the throughflow direction (11). More than one fluid receiving chamber is arranged one after the other in the throughflow direction (11). The fluid receiving chamber that is first upstream and the fluid receiving chamber that is last downstream immediately adjoin the fluid inlet (35) and the fluid outlet (41), respectively.

15 Claims, 3 Drawing Sheets

(51) Int. Cl.
    *F16L 55/027*      (2006.01)
    *F16L 55/05*      (2006.01)
    *F16L 55/033*      (2006.01)

(52) U.S. Cl.
    CPC ....... *F16L 55/02754* (2013.01); *F16L 55/033* (2013.01); *F16L 55/04* (2013.01); *F16L 55/041* (2013.01); *F16L 55/05* (2013.01)

(58) Field of Classification Search
    USPC .............................................. 138/26, 39, 42
    See application file for complete search history.

(56) References Cited

U.S. PATENT DOCUMENTS

| | | | | |
|---|---|---|---|---|
| 2,943,641 | A * | 7/1960 | Arnold | F04B 39/0055 138/26 |
| 3,212,521 | A * | 10/1965 | Jean | B01J 3/006 137/494 |
| 3,532,128 | A * | 10/1970 | Webb | F15D 1/02 138/45 |
| 3,578,107 | A * | 5/1971 | Everett | F16L 55/02 181/232 |
| 4,427,029 | A * | 1/1984 | Charney | B01D 15/163 138/30 |
| 5,016,730 | A | 5/1991 | Kaiser, Jr. et al. | |
| 5,797,430 | A * | 8/1998 | Becke | F04B 11/0016 138/26 |
| 5,941,283 | A | 8/1999 | Forte | |
| 7,520,661 | B1 * | 4/2009 | Lawson | B01F 5/0604 138/42 |
| 2002/0069921 | A1 | 6/2002 | Zanardi | |
| 2004/0035481 | A1 * | 2/2004 | Lim | B01F 5/0646 138/42 |
| 2006/0124186 | A1 | 6/2006 | Chen | |
| 2013/0186499 | A1 * | 7/2013 | Yada | G01F 1/34 138/40 |
| 2016/0201837 | A1 * | 7/2016 | Hartmann | F16L 55/041 137/14 |

FOREIGN PATENT DOCUMENTS

| | | |
|---|---|---|
| DE | 600 17 902 | 1/2006 |
| DE | 10 2007 003 631 | 7/2008 |
| DE | 20 2014 006 687 | 10/2014 |

* cited by examiner

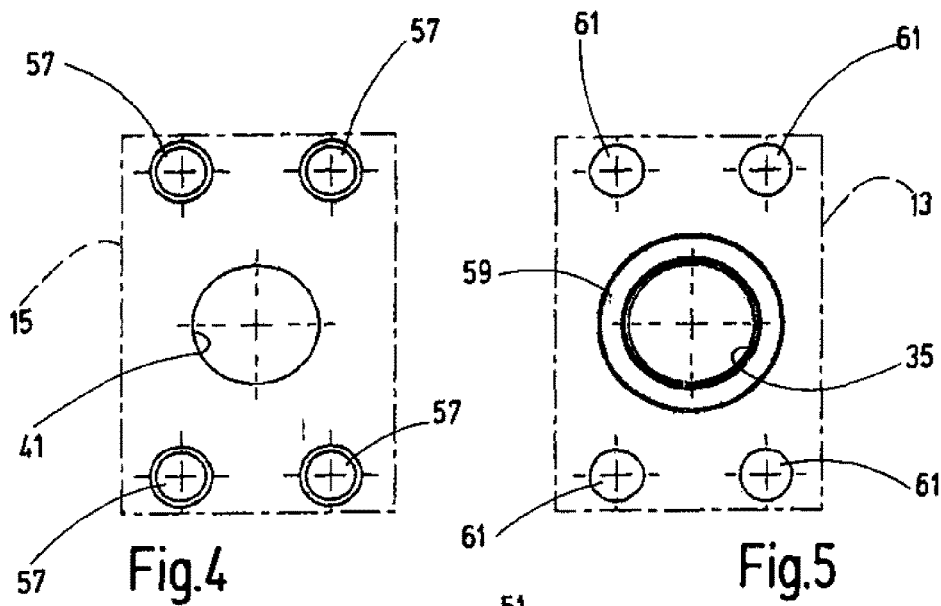
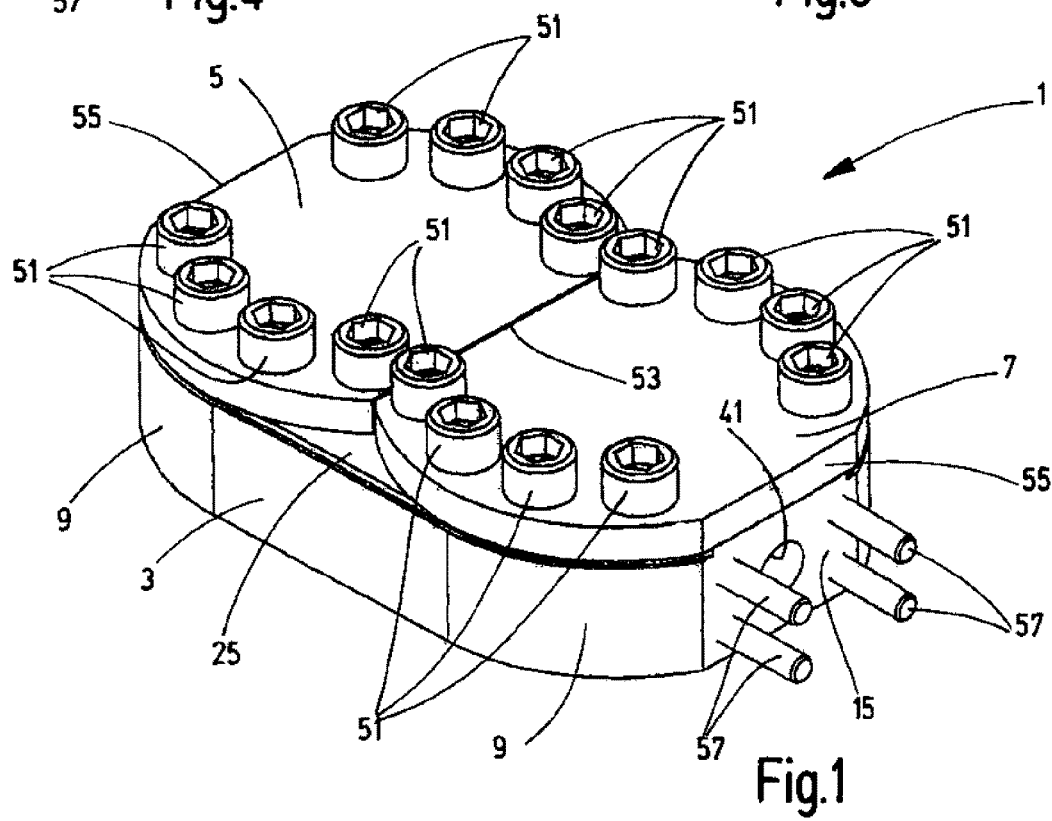

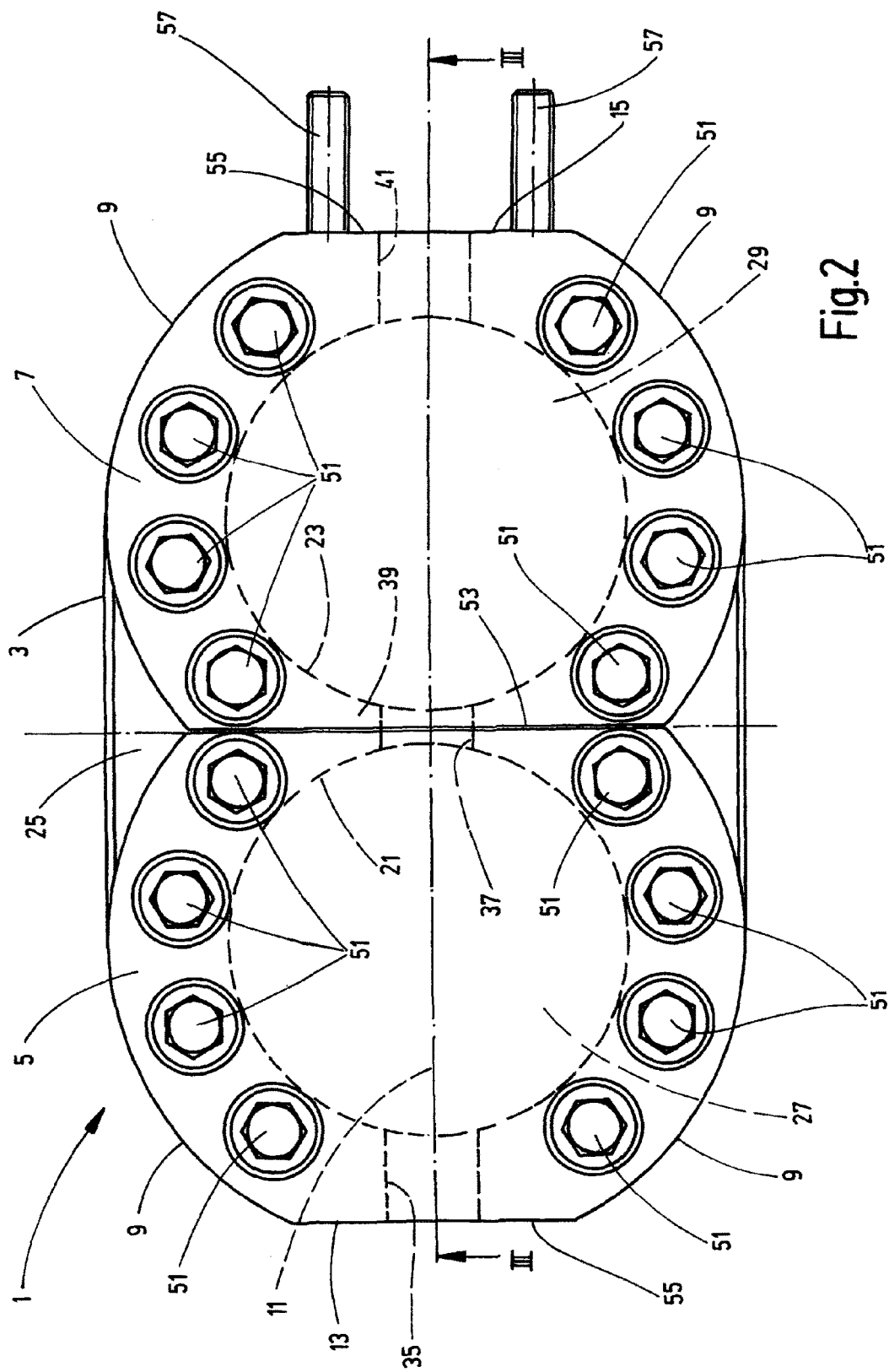

DAMPING DEVICE

FIELD OF THE INVENTION

The invention relates to a damping device, in particular for damping or avoiding pressure surges, such as pulsations, in hydraulic supply circuits, preferably in the form of a silencer. The damping device has a damping housing surrounding a damping chamber and has at least one fluid inlet, at least one fluid outlet and a fluid receiving chamber extending between the fluid inlet and the fluid outlet. During operation of the device, a fluid flow crosses the damping chamber in a throughflow direction, coming from the fluid inlet in the direction of the fluid outlet. At least parts of the fluid receiving chamber extend in at least one extension direction transversely with respect to the throughflow direction.

BACKGROUND OF THE INVENTION

Damping devices of this kind are state of the art. Such hydraulic dampers, which are also referred to as sound dampers or silencers, serve to reduce oscillations. The oscillations are generated by pressure pulsations, to which a corresponding hydraulic system is repeatedly subjected, in particular due to the operation of hydraulic pumps. As is disclosed in the document DE 102 17 080 C1, the known damping devices of this kind have a damping housing in the form of a circular cylinder, which is rounded in a spherical manner at both axial end regions. The fluid inlet and the fluid outlet are located coaxial to the cylinder axis on a respective end region. As the damping chamber, which the fluid flow crosses from the fluid inlet to the fluid outlet, a damping tube is provided in such damping devices, which tube extends coaxially between the fluid inlet and the fluid outlet. The tube wall has openings to the fluid chamber surrounding the tube. According to the cylinder diameter, the fluid chamber is radially expanded relative to the axial throughflow direction defined by the damping tube.

SUMMARY OF THE INVENTION

On the basis of this prior art, the problem addressed by the invention is to provide a damping device of the type considered, which, while having a simple construction, is distinguished by an advantageous operational behavior.

According to the invention, this problem is basically solved by a damping device having, as a significant distinguishing feature of the invention, plural fluid receiving chambers arranged one after the other in the throughflow direction, with the fluid receiving chamber which is first upstream and the fluid receiving chamber that is last downstream immediately adjoining the fluid inlet or the fluid outlet, respectively. Due to the direct connection of the fluid receiving chambers to the fluid inlet or fluid outlet and the resulting omission of a damping tube, the device according to the invention is firstly distinguished by a simplified construction. Furthermore, the presence of more than one fluid receiving chamber permits better tuning of the damping device to different pulsation frequencies. This tuning is advantageous in particular in the case of variable-speed drives, for example in the form of screw compressors, which produce a large range of frequencies as an excitation spectrum.

In particularly advantageous exemplary embodiments, the fluid receiving chambers expanded transversely relative to the throughflow direction are formed by disk-shaped cavities inside the damping housing. The disk-shaped cavities are able to be formed cylindrical or as polygons, while other shapes, for example oval contours, can also be considered for a targeted frequency tuning.

The respective cavities can have the same volumes and the same contours, or can be formed differently with respect to volumes and/or contours.

In particularly advantageous exemplary embodiments, the cavities can be closed by boundary walls of the damping housing that extend parallel to one another, with parts of the fluid inlet and of the fluid outlet extending in alignment with these boundary walls in the damping housing. The fluid inlet and fluid outlet are formed as damping housing borings and are able to have an identical diameter. That diameter can correspond to the spacing between the boundary walls.

The arrangement can particularly advantageous when the damping housing is formed in several pieces and such that the following components are provided:
a base part, which receives pot-shaped central recesses with the one set of boundary walls and the fluid inlet and fluid outlet,
and
flange-shaped cover parts that, with the other boundary walls being part of engagement pieces, engage in a flush manner in the central recesses of the base part in the case of cover parts fixed to the base part.

For the purpose of sealing the cavities relative to the environment, a sealing device can be on the engagement piece of the cover parts. The sealing device is in particular in the form of a sealing ring inserted into a circumferential groove and seals the respective cavity as a component of the central recesses relative to the environment.

For a pressure-tight formation of the damping housing, the cover parts can have, lying opposite diametrical to their vertical axis, several penetration bores. The bores can be penetrated by fixing screws to fix the cover parts to the base part. Advantageously, the fixing screws are arranged to leave the region of the fluid inlet and the fluid outlet free, and are arranged uniformly along an external circumference of the cover parts on the damping housing surrounding the disk-shaped fluid receiving chambers.

In advantageous exemplary embodiments, two cavities are provided consecutively in the throughflow direction, and are connected to one another by a fluid passage aligned with the fluid inlet and fluid outlet of the damping housing. The fluid passage is located in a wall section of the base part and has the same diameter as the fluid inlet and the fluid outlet.

For the connection to a corresponding hydraulic system, on the fluid inlet and/or on the fluid outlet on the damping housing, a receptacle for a sealing ring can be provided. The sealing ring surrounds the fluid inlet and/or the fluid outlet. In the manner of a fixing block, the damping housing can be fixed to third components by several fixing bolts, which surround the region of the fluid inlet and/or the fluid outlet.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure:

FIG. 1 is a perspective view of a damping device according to an exemplary embodiment of the invention, relative to a practical embodiment, is depicted downscaled with a scale of approximately 1:3;

FIG. 2 is a top view of the damping device of FIG. 1, depicted double the size of FIG. 1;

FIG. 4 is a partial end view of only the fluid outlet connection region of the damping housing of the exemplary embodiment; and FIG. 5 is a partial end view, of only the fluid inlet connection region of the exemplary embodiment.

DETAILED DESCRIPTION OF THE INVENTION

Figure 3:
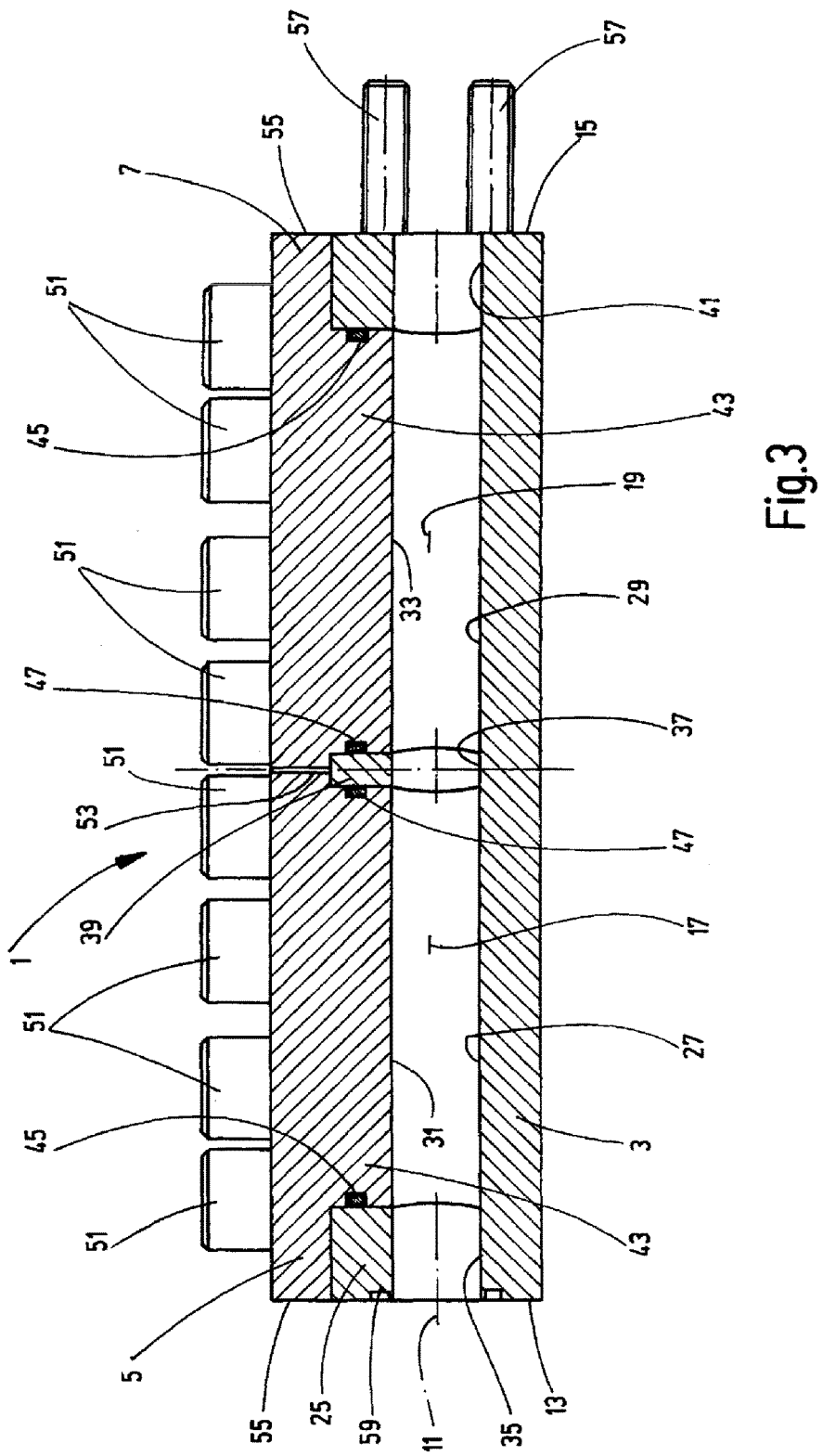
FIG. 3 is a side view in section of the exemplary embodiment along line III-III of FIG. 2.

With reference to the drawings, the invention is explained on the basis of the exemplary embodiment of a silencer provided to reduce the oscillations produced by pulsations in hydraulic fluids subject to high pressure, for example in the region of 200 bar. The basic mechanical construction corresponds to a silencer provided for such an application, as is described as subsequently published prior art in the patent application DE 10 2014 005 822.0. In the present figures, the exemplary embodiment of the damping device is depicted in the assembled state. As can be best seen from FIG. 3, the damping housing 1 depicted in these figures has three main parts, namely, a base part 3 and cover parts 5 and 7, which cover parts are formed as identical parts. As FIGS. 1 and 2 show, the base part 3 has the contour of a rectangle having rounded corner regions 9 and having a longitudinal axis 11. The extension of the longitudinal axis corresponds to the throughflow direction of the fluid, which flows into the device from the end side 13 lying on the left-hand side in the figures and 10 and leaves the device at the opposite end side 15. For the formation of the fluid receiving chambers 17 and 19, the base part 3 has two central recesses 21 and 23 (cf. FIG. 2). Recesses 21, 23 are formed by circular, pot-like depressions and are delimited by unrecessed, surrounding wall parts 25 (FIG. 3) of the base part 3. The central recesses 21, 23 are closed at the base by boundary walls 27 and 29 of the base part 3, which boundary walls extend in a common plane. For the purpose of limitation of the fluid receiving chambers 17 and 19 having a disk-shape, the cover parts 5 and 7 with their planar bottom side form top boundary walls 31 and 33 that, in the case of cover parts 5 and 7 mounted on the base part 3, extend in a plane parallel to the boundary walls 27 and 29. The fluid inlet 35 is located on the end side 13 of the base part 3 and lies on the left-hand side in the drawings, which fluid inlet is aligned with the boundary walls 27 and 31, so that the diameter of the fluid inlet 35 corresponds to the thickness of the circular disk-shaped fluid receiving chamber 17.

The circular disk-shaped cavity forming the second fluid receiving chamber 19 is formed in the central recess 23 of the base part 3 and is connected to the fluid receiving chamber 17 that is first upstream by a fluid passage 37. Fluid passage 37 is located in the wall section 39 of the base part 3 that lies centrally between the end sides 13 and 15. The fluid passage 37 is coaxial to the axis 11 and has the same diameter as the fluid inlet 35. In the depicted exemplary embodiment, both fluid receiving chambers 17 and 19 are formed by circular central recesses 21 and 23 of the same type and they therefore have the same volumes. In the end side 15 lying on the right in the drawings, the fluid outlet 41 is located in the wall part 25 of the base part 3, which fluid outlet, like the fluid inlet 35 and the fluid passage 37, is coaxial to the axis 11, and thus, to the throughflow direction and has the same diameter as the fluid inlet 35 and the fluid passage 37.

As can be seen from FIG. 3, the cover parts 5 and 7 are designed as flange-shaped identical parts. Starting from a top side, which, in the state mounted on the base part 3, overlaps the wall parts 25 of the base part and the wall section 39, the cover parts 5 and 7 each have a projecting engagement piece 43, which is formed circular cylindrical and, in the case of a position mounted on the base part 3, engages in a fitting manner in the central recesses 21 or 23. Each engagement piece 43 has a circumferential annular groove 45, in which a sealing ring 47 is seated. Sealing ring 47 seals the engagement pieces 43 relative to the wall parts 25 and to the wall section 39 of the base part 3, and thus, seals the fluid receiving chambers 17 and 19 relative to the environment.

For the screwing of the cover parts 5, 7 to the base part 3, threaded bores are formed in the base part, which are not visible in the drawings. For eight fixing screws 51 of each cover part 5, 7, these threaded bores are arranged in partial circular arcs, which surround the central recesses 21 and 23. By the fixing screws and threaded bores, the cover parts 5, 7 can be fixed to the base part 3 in such a way that they adjoin one another with their flat side 53 at the central wall section 39 of the base part 3. In the region opposite the flat side 53, the cover parts 5, 7 are shaped such that, in the mounted state, they are adapted to the outer contour of the base part 3, with flat sides 55 of the cover parts 5, 7 respectively being flush with the end side 13 and the end side 15 of the base part 3 at the fluid inlet 35 and the fluid outlet 41 and with a step-free outer shape being formed also in the rounded corner regions 9 also.

For the attachment of the damping housing 1 to corresponding third components, in the depicted exemplary embodiment at the end side 15 lying on the right-hand side in the drawings threaded bolts 57 are provided arranged symmetrical to the fluid outlet 41. In addition, a receiving groove 59 for a sealing ring is formed at the opposite end side 13 at the fluid inlet 35. For coupling connections, fixing bores 61 are arranged at the end side 13 in a symmetrical arrangement relative to the fluid inlet 35.

It shall be understood that, in a corresponding manner, a sealing arrangement can be provided at the end side 15 assigned to the fluid outlet 41. The symmetrical housing construction also allows the interchanging of the inlet side and the outlet side, potentially with changed sealing geometries. Due to the disk-shaped damping chambers with a cavity expanded transverse to the actual throughflow direction, a silencer with high efficiency is obtained, which silencer has a low weight relative to its settable fluid volume. Furthermore, there is only a slight amplification, if any, between the silencer and a hydraulic pump connectable thereto.

In one embodiment of the damping device according to the invention, which is not depicted in detail, it is possible for the individual, consecutively arranged damping chambers 17, 19 to be differently designed with respect to their volume, in order to then create damping chambers of different sizes, so that individual frequency bands with different frequencies can be effectively dampened, with one damping chamber 17 being able to be assigned to the one frequency band and the other damping chamber 19 being able to be assigned to the comparatively different type of frequency band. Furthermore, in an additional consecutive arrangement, which is likewise not depicted, a further third damping chamber and, if appropriate, additional damping chambers can be connected to the two first damping chambers 17, 19, if appropriate with changed volumes, so that, starting from a damping chamber with the smallest volume to a largest damping chamber connected thereto in a media-conducting manner, within the chain a relief of the pressure sequence of the media flow takes place, so that effective damping effects can be generated in this respect also. There is no equivalent of this solution in the prior art.

While one embodiment has been chosen to illustrate the invention, it will be understood by those skilled in the art that various changes and modifications can be made therein without departing from the scope of the invention as defined in the claims.

The invention claimed is:

1. A damping device for damping pressure surges in hydraulic supply circuits, comprising:
    a damping housing having a fluid inlet, a fluid outlet, a base part with pot-shaped recesses and flanged-shaped first and second cover parts, said first and second cover parts being engaged flush in said pot-shaped recesses;
    a damping chamber surrounded by said damping housing and extending between said fluid inlet and said fluid outlet such that a fluid flow crosses said damping chamber in a throughflow direction from said fluid inlet to said fluid outlet, parts of said damping chamber extending transverse to the throughflow direction, said damping chamber including first and second fluid receiving chambers arranged sequentially in the throughflow direction, said first fluid receiving chamber immediately adjoining said fluid inlet and being upstream of said second fluid receiving chamber in the throughflow direction, said second fluid receiving chamber immediately adjoining said fluid outlet and being downstream of said first fluid receiving chamber in the throughflow direction, said first and second fluid receiving chambers forming disk-shaped cavities in said base part;
    first and second base boundary walls in said base part defining said first and second fluid receiving chambers, respectively; and
    first and second cover boundary walls on said first and second cover parts, respectively, defining said first and second fluid receiving chambers, respectively.
2. A damping device according to claim 1 wherein each of said first and second fluid receiving chambers is at least one of cylindrical or polygonal.
3. A damping device according to claim 1 wherein each of said first and second fluid receiving chambers has equal volumes and has a same contour.
4. A damping device according to claim 1 wherein each of said first and second fluid receiving chambers has a different volume and a different contour.
5. A damping device according to claim 1 wherein said first and second base boundary walls are parallel to said first and second cover boundary walls; and
    said fluid inlet and said fluid outlet are aligned with said base and cover boundary walls.
6. A damping device according to claim 5 wherein said fluid inlet and said fluid outlet comprise damping housing bores with cross-sectional diameters equal to a distance spacing said first and second base boundary walls from said first and second cover boundary walls.
7. A damping device according to claim 6 wherein said first and second fluid receiving cavities are connected in fluid communication via a fluid passage axially aligned with said fluid inlet and said fluid outlet, said fluid passage being located in a wall segment of said base part and having equal cross-sectional diameters with said fluid inlet and said fluid outlet.
8. A damping device according to claim 1 wherein sealing rings are received in circumferential grooves on engagement pieces of said first and second cover parts, said sealing rings seal said first and second fluid receiving chambers relative to an environment surrounding said damping housing.
9. A damping device according to claim 1 wherein said first and second cover parts have penetration bores extending diametrically opposite to vertical axes of said first and second cover part, said penetration bores being penetrated by fixing screws engaged with said base part to fix said cover parts to said base part.
10. A damping device according to claim 9 wherein said fixing screws are spaced from regions of said fluid inlet and said fluid outlet and are uniformly arranged along external circumferences of said first and second cover parts and surrounding said first and second first and second fluid receiving chambers.
11. A damping device according to claim 1 wherein said first and second fluid receiving cavities are connected in fluid communication via a fluid passage axially aligned with said fluid inlet and said fluid outlet, said fluid passage being located in a wall segment of said base part and having equal cross-sectional diameters with said fluid inlet and said fluid outlet.
12. A damping device according to claim 11 wherein said wall segment extends from a junction of said first and second base boundary walls and engages facing surfaces of said first and second cover plates.
13. A damping device according to claim 1 wherein receptacles receiving sealing rings surround said fluid inlet and said fluid outlet on exterior surfaces of said damping housing.
14. A damping device according to claim 1 wherein said damping device is fixable to another component by fixing bolts surrounding at least one of said fluid inlet or said fluid outlet.
15. A damping device according to claim 1 wherein both of said first and second fluid receiving chambers are in a single one of said damping housing.

* * * * *